Feb. 13, 1940.    G. H. ENNIS    2,190,260
APPARATUS FOR DETERMINING PRESSURE AND TEMPERATURE IN A WELL
Original Filed July 25, 1934    2 Sheets-Sheet 1
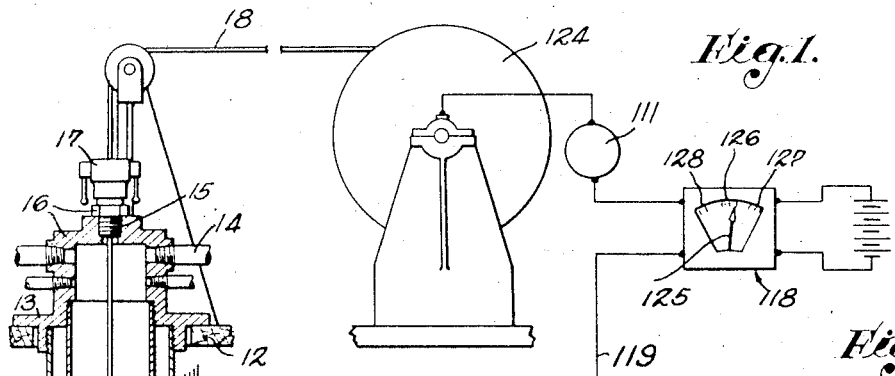
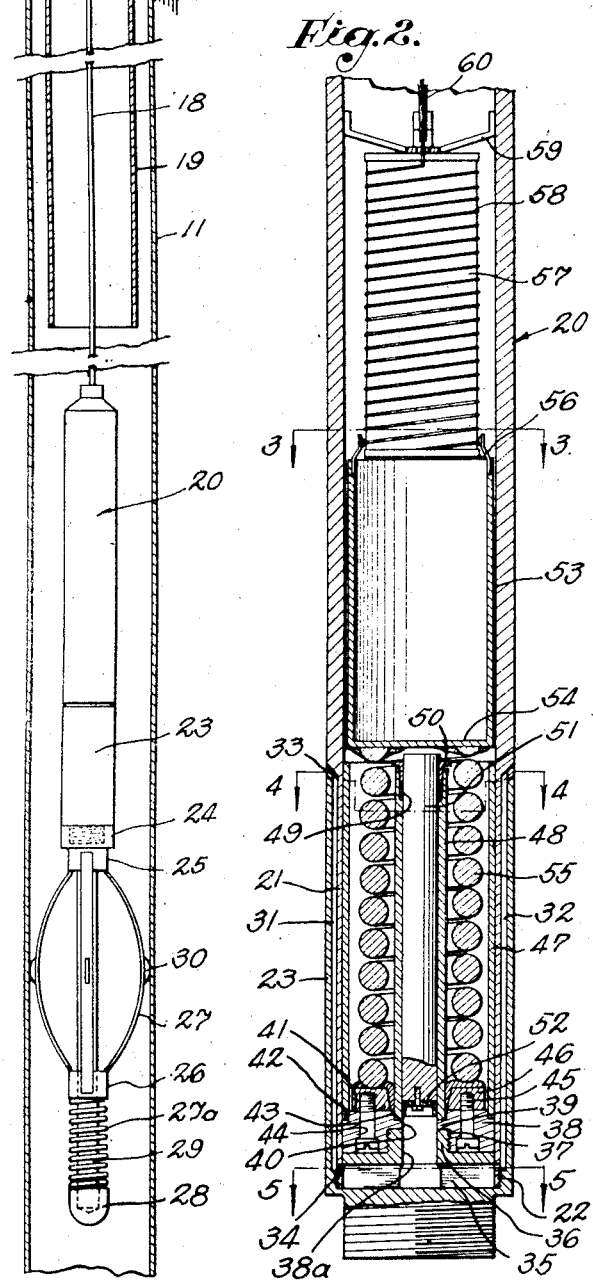
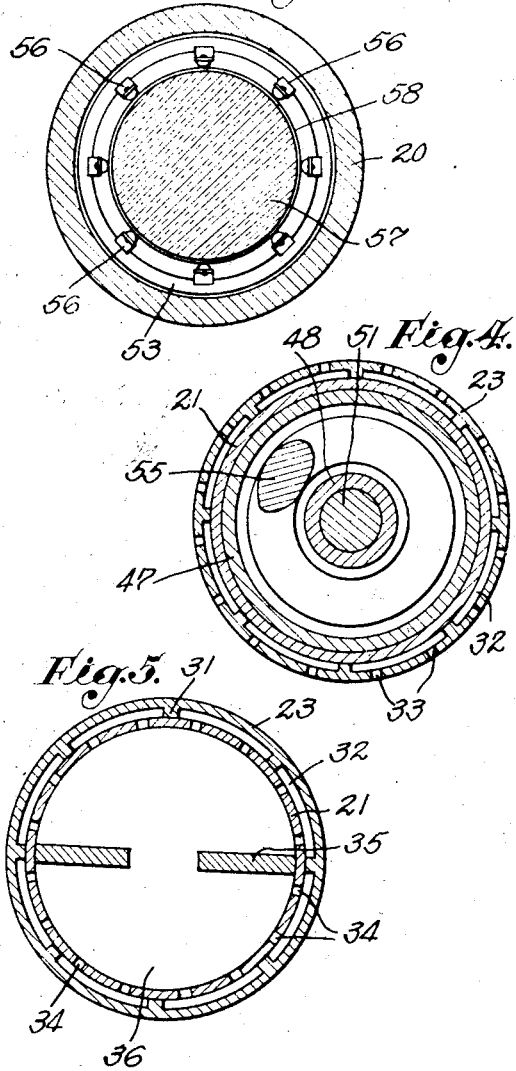
INVENTOR
GEORGE H. ENNIS
BY
Fred W Lauir
ATTORNEY.

Feb. 13, 1940.   G. H. ENNIS   2,190,260
APPARATUS FOR DETERMINING PRESSURE AND TEMPERATURE IN A WELL
Original Filed July 25, 1934   2 Sheets-Sheet 2
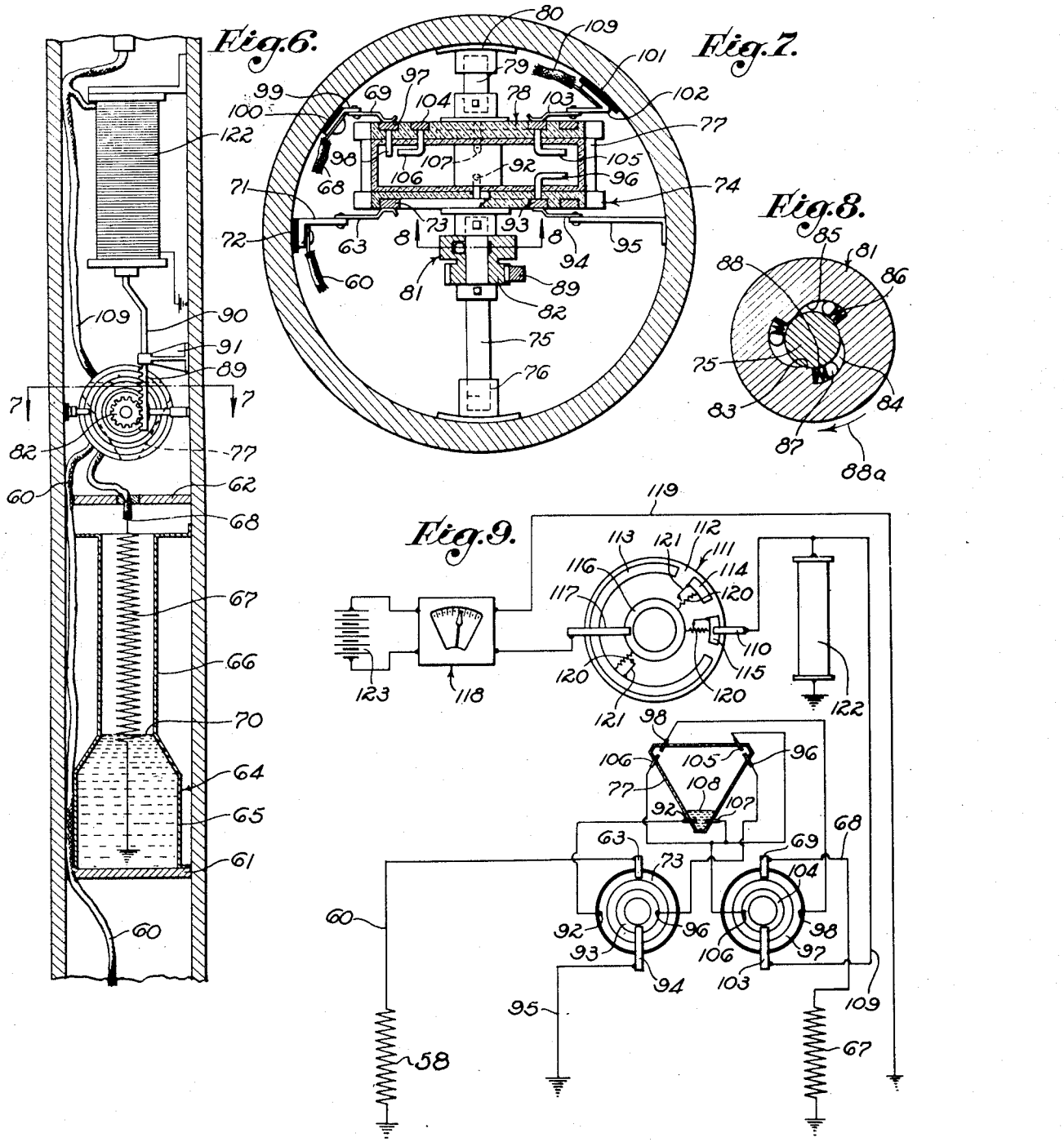
INVENTOR
GEORGE H. ENNIS
BY
ATTORNEY.

Patented Feb. 13, 1940

2,190,260

UNITED STATES PATENT OFFICE 2,190,260

APPARATUS FOR DETERMINING PRESSURE AND TEMPERATURE IN A WELL

George H. Ennis, Long Beach, Calif., assignor of one-half to Robert V. Funk, Long Beach, Calif.

Continuation of application Serial No. 736,892, July 25, 1934. This application January 21, 1936, Serial No. 60,143

3 Claims. (Cl. 73—345)

My invention relates to the oil producing industry and relates particularly to an apparatus by which temperatures or pressures, or both, which exist within an oil well may be correctly determined at the surface of the ground. It is well known in the oil producing industry that such information is of great value in obtaining maximum oil production from the oil fields and in securing best efficiency.

It is an object of my invention to provide an apparatus which will correctly determine accurate temperatures or pressures, or both temperatures and pressures, which exist in a well.

It is another object of my invention to provide an apparatus of the character pointed out heretofore in which any changes which occur in the condition of the transmitting means whereby the intelligence is transmitted to the surface of the ground may be determined, and in which the indication or reading is corrected in accordance therewith in order that a correct temperature or pressure, or temperature and pressure, reading may be obtained.

It is also an object of my invention to provide an apparatus in which data obtained at the surface of the ground may be corrected in accordance with any changes which occur in the transmitting means in order that such changes may be compensated for in order that accurate data may be obtained.

Producing oil wells usually comprise a casing extending down into the oil producing zone, and a tubing within the casing. To take a well off production and shut off the flow therefrom in order to make a test of the temperature or pressure of the liquid in the well is a laborious, time consuming and expensive procedure. Further expense and loss of production may be incurred if, in order to make such tests, it is necessary to withdraw from the well the tubing which, in wells of great depth, is necessarily of a small diameter.

It is an object of my invention to provide an apparatus for measuring pressure and temperature at various depths in a well which does not require that the well be taken off production or that the tubing be removed from the well and which permits the measurements of such conditions to be made within the casing and below the lower end of the tubing.

Further objects of my invention are to provide an apparatus of the class described which can be quickly and easily installed in and removed from an oil well and which is inexpensive in its manufacture, durable in its service, and accurate and dependable in its functions.

The foregoing objects and advantages will be made evident in the following description of the preferred embodiment of the apparatus of my invention, which may be better understood with reference to the accompanying drawings in which, Fig. 1 is a utility view illustrating an embodiment of the apparatus of my invention installed in an oil well;

Fig. 2 is a fragmentary sectional view of a portion of such embodiment;

Figs. 3 to 5, inclusive, are sectional views taken as indicated by the correspondingly numbered lines of Fig. 2;

Fig. 6 is a vertical sectional view of another portion of the apparatus of my invention;

Fig. 7 is a sectional view taken an indicated by the line 7—7 of Fig. 6;

Fig. 8 is a fragmentary view taken as indicated by the line 8—8 of Fig. 7; and

Fig. 9 is a diagrammatic view of the electric circuit of the apparatus of my invention.

Referring to the drawings, which are for illustrative purposes only, the numeral 11 indicates a casing extending from a derrick floor 12 down in an oil well to the oil producing zone. Secured to the upper end of the casing 11 is a head 13 supported in any suitable manner upon the derrick floor 12. The head 13 is provided with discharge pipes 14 through which the oil produced from the well is led off, and is also provided with a threaded opening 15 in its upper end. Secured in the threaded opening 15 is a fitting 16 having a central opening therein and supporting a packing member 17 thereabove. The packing member 17 has a central opening and suitable packing, not shown, so that a cable 18 may be extended through the packing member 17 and the fitting 15 into the well in such a manner that the cable 18 may be moved upwardly or downwardly while maintaining a fluid-tight engagement with the packing member 17.

Secured to the head 13 is an oil tubing 19 which extends downwardly within the casing 11. Adapted to be lowered through the tubing 19 on the cable 18 is a cylindrical body 20 of a considerably lesser external diameter than the internal diameter of the tubing 19. At the lower end of the cylindrical body is a portion 21 of reduced diameter which is provided with external threads 22 for threaded engagement with a telescoping member 23 extending upwardly around the reduced portion 21. The lower end of the telescoping member 23 is threaded to an upper sleeve member 24 which is of substantially the same external diameter as the cylindrical body 20 and has a reduced portion 25. Connecting the reduced portion 25 of the upper sleeve member 24 to a lower sleeve member 26 of substantially the same diameter as the reduced portion 25 are four engagers 27.

As is well illustrated in Fig. 1, the engagers 27 are curved outwardly and, being formed of resilient material, they are urged into frictional engagement with the interior of the tubing 19 or the casing 11 by a compression spring 27a. The upper end of the compression spring 27a urges the lower sleeve member 26 upwardly, thus tending to move the engagers 27 outwardly, the lower end of the spring 27a abutting against a cap 28 threaded on the lower end of a rod 29 which extends through the lower sleeve member 26 and is secured to the upper sleeve member 24. Contactors 30 in the form of knife edges of tungsten carbide or stellite, or any suitable conductor having good wear-resisting qualities, are secured to the outer face of the engagers 27 substantially midway between their ends so that the contactors 30 may cut through any foreign material on the inner surface of the tubing 19 or the casing 11 to make a good electrical contact for the engagers 27.

As is well illustrated in Figs. 2 and 4, the upper end of the telescoping member 23 engages the annular shoulder separating the reduced portion 21 from the remainder of the cylindrical body 20. The telescoping member 23 is provided with inwardly projecting longitudinal fins 31 engaging the reduced portion 21 and defining between the telescoping member 23 and the reduced portion 21 longitudinal passages 32. Each of the longitudinal passages 32 communicates at its upper end with the exterior of the telescoping member 23 through radial passages 33 and communicates at its lower end with the interior of the cylindrical body 20 through radial passages 34 in the reduced portion 21.

Resting upon an annular shoulder separating the lower externally threaded end of telescoping member 23 from the remainder of the interior of the member 23 are downwardly extending radial projections 35 of a cap 36 which has a central upwardly extending, externally threaded hub 37. Secured to the projection 37 is a locking member 38 having an inwardly extending flange 39 defining a central passage 40 of the same diameter as a passage 38a in the projection 37. The locking member 38 includes an upwardly extending projection 41 defining an outer and inner annular shoulders 42 and 43, respectively, and is provided with a plurality of vertical bores 44 for the reception of screws 45 which extend through the locking member 38 and are threadedly received in a ring 46 above the locking member 38. The ring 46 has an external diameter slightly less than the external diameter of the projection 41 and of the locking means 38 and an inner diameter slightly greater than the inner diameter of the projection 41.

Secured within the cylindrical body 20 as by a force fitting or in any other suitable manner, is an outer stationary sleeve 47 with its lower end resting upon the outer annular shoulder 42 of the locking member 38, and with its upper end approximately on the level of the radial passages 32 of the cylindrical body 20. Resting on the inner annular shoulder 43 of the locking member 38 and secured in any suitable manner, as by welding to the ring 46, is an inner stationary sleeve 48 of approximately the same length as the outer stationary sleeve 47. The inner stationary sleeve 48 has an inner diameter substantially equal to the diameter of the passages 38a and 40, except for a portion 49 at the upper end which is of an enlarged diameter for the reception of a packing gland 50. The gland 50 surrounds, in fluid-tight relationship, a plunger 51 slidably disposed within the inner stationary sleeve 48. Secured to the lower end of the plunger 51 there is a plunger head 52 of rubber, leather or the like, and positioned so as to engage the upper end of the plunger 51 there is a movable cylinder 53. The movable cylinder 53 includes an imperforate bottom 54 and is open at its upper end. Secured to the lower surface of the bottom 54 is the upper end of a tension spring 55, the lower end of which is secured in any suitable manner, as by welding, to the upper face of the ring 46.

A plurality of electrical contacts 56 is secured to the upper end of the movable cylinder 53. As illustrated in Fig. 3, the movable contacts 56 are eight in number and are preferably formed by upwardly and inwardly extending resilient fingers adapted for resiliently engaging the surface of a resistance supporting cylinder 57. The cylinder 57, which is formed of material of good insulating quality, has spirally wound thereon a resistance wire 58, the outer diameter of the cylinder 57 and the wire wound thereon being less than the inner diameter of the cylinder 53, so that the cylinder 53 may move to surround the resistance-supporting cylinder 57 which is held centrally of the cylindrical body 20 and stationary therein as by arms 59 extending outwardly from the upper end of the cylinder 57 into engagement with the cylindrical body 20.

The resistance wire 58 is electrically connected to a conductor 60 which extends between the arms 59 and is insulated relative thereto. The conductor 60 extends upwardly, as illustrated in Fig. 6, through a lower partition wall 61 and an upper partition wall 62, and is electrically connected to a brush 63.

Supported upon the lower partition 61 and extending upwardly therefrom is a container 64 having a lower reservoir 65 and an upper throat 66 of smaller diameter than the reservoir 65. Disposed within the container 64 is a resistance wire 67, the lower end of which is electrically connected to the lower partition 61 which in turn is electrically connected to the cylindrical body 20. That portion of the resistance wire 67 within the throat 66 is coiled for a purpose which will be later described, and the upper end of the resistance wire 67 is electrically connected to a conductor 68 which extends through the upper partition wall 62 and is electrically connected to a brush 69. The reservoir 65 of the container 64 is filled with a conductive liquid, such as mercury, so that the level of liquid is within the throat 66, as indicated by the numeral 70 of Fig. 6.

As illustrated in Fig. 7, the brush 63 is mounted upon a bracket 71 which is connected by an insulator 72 to the inner wall of the cylindrical body 20 and is adapted for continuous engagement with an outer ring 73 mounted in a primary disc 74. The primary disc 74 is non-rotatably secured to one end of a shaft 75, the other end of which is rotatably supported in a journal member 76 attached to the inner wall of the cylindrical body 20. The primary disc 74 is secured to a closed receptacle 77 which is substantially triangular in vertical cross-section. To the other side of the receptacle 77 there is secured a secondary disc 78 which is non-rotatably attached to a shaft 79 rotatably supported in a journal member 80 secured to the inner wall of the cylindrical body 20 diametrically opposite to the journal member 76, so that the shafts 79 and 75 are in axial alignment.

Rotatably mounted upon the shaft 75 is a housing 81 on which is provided a pinion 82. As is best illustrated in Fig. 8, the housing 81 has a central opening 83 of a diameter sufficient to permit the housing 81 to rotate freely on the shaft 75. Formed in the housing 81 and communicating with the central opening 83 is a plurality of recesses 84, each of which has one wall 85 curved eccentric to the center of the opening 83 and one wall 86 radial of the opening 83 and intersecting the wall 85. Disposed within each of the recesses 84 is a ball 87, which balls are urged toward the narrow parts of the recesses 84 by springs 88. This forms a clutch arrangement of a well-known type, which enables the shaft 75 to be rotated only in a clockwise direction.

In meshing relationship with the pinion 82 is a rack 89 having an arm 90 extending upwardly therefrom, and slidably supported by a bracket 91 secured to the inner wall of the cylindrical body 20, so that the rack 89 is held in meshing relationship with the pinion 82 and is vertically movable relative thereto.

The primary disc 74 is formed of a non-conductive material into the outer face of which the outer ring 73 is sunk. Electrically connected to the outer ring 73, which is formed of a conductive material, is a contact 92 which extends inwardly from the primary disc 74 and into the closed receptacle 77, as illustrated in Fig. 7. The primary disc 74 is also provided with an inner concentric annular ring 93 likewise formed of conductive material and set into the outer face of the primary disc 74. This inner ring 93 is engaged by a brush 94 mounted upon an arm 95 which is electrically connected to the inner wall of the cylindrical body 20, so that the inner ring 93 is grounded, and is therefore in electrical contact with the well casing which forms a part of the electrical circuit. Electrically connected to the inner ring 93 and extending inwardly therefrom, is a contact 96. As illustrated in Fig. 7, the contact 96 extends into the closed receptacle 77 and is spaced from the contact 92 approximately 120°.

The brush 69, previously described, is in constant electrical contact with an outer annular ring 97 of conductive material set into the outer face of the secondary disc 78, which disc is formed of a non-conductive substance. The outer ring 97 is electrically connected to a contact 98 which extends into the closed receptacle 77 and is spaced approximately 120° from both the contact 92 and the contact 96. The brush 69, like the brush 63, is mounted upon a bracket 99 which is secured to the cylindrical body 20 and insulated therefrom by insulation 100.

Secured in a similar manner to the cylindrical body 20 by an insulator 101 is a bracket 102 supporting a brush 103 which is in constant electrical connection with an inner ring 104 of conductive material set into the outer face of the secondary disc 78 concentric with the outer ring 97. The inner ring 104 is provided with one contact 105 which extends through the secondary disc 78 into the closed receptacle 77 adjacent the contact 96. The inner ring 104 is also connected to another contact 106 which extends through the secondary disc 78 and into the closed receptacle 77 adjacent the contact 98. A third contact 107 is provided on the inner ring 104 and extends into the closed receptacle 77 adjacent the contact 92.

The closed receptacle 77 contains a body 108 of a conductive liquid, such as mercury, of a sufficient quantity so that when any one of the apexes of the triangular receptacle 77 is lowermost, the body of conductive liquid will electrically connect the contacts 98 and 106, or the contacts 92 and 107, or the contacts 96 and 105.

Connected to the bracket 102 and extending upwardly therefrom is a conductor 109 which is electrically connected at the surface of the ground to a brush 110 of a circuit interrupter 111. The circuit interrupter 111 includes a disc 112 of non-conductive material to which there is secured three segments 113, 114 and 115 of conductive material. As illustrated in Fig. 9, the segment 113 extends through approximately 270°, while the segments 114 and 115 extend through approximately 30°.

Also mounted on the disc 112 is an inner ring 116 of conductive material which is electrically connected by a brush 117 to one terminal of a current indicating device 118, the other terminal of the device being grounded by a conductor 119 to the casing 11 with which the body 20 is in electrical contact. Connecting each of the segments 113 to 115 to the inner ring 116 is a resistance 120. Each segment is also electrically connected to an engager 121 adapted for electrical contact with one of the resistances 120 so that the electrical resistance between each of the segments 113 to 115 and the inner ring 116 may be varied. The purpose of providing the rheostats comprising the parts 120 and 121 is to provide suitable resistance in the circuit at different periods so that the pointer or indicator 125 of the indicating device 118 will indicate on the portions 126, 127, and 128 of the indicating means 118 when the switch, including the receptacle 77, is in its three positions corresponding to the contacts 113 to 115 inclusive which may be in engagement with the brush contact 110. The method of adjusting the rheostats will be pointed out when a description of the apparatus and the method of my invention is described.

A solenoid 122 is disposed within the cylindrical body 20 above the discs 74 and 78, its winding being electrically connected to the conductor 109 and to the cylindrical body 20. The movable core of the solenoid 122 is attached to the rod 90 formed on the rack 89.

Connected to the indicating device 118 is a source of energy which is represented in the form of a battery 123. In actual practice this source of energy may be a constant voltage generator or equivalent.

From an inspection of Fig. 9 it will be seen that the apparatus of my invention includes an electric circuit which extends from a point at the surface of the ground to a point in the well where the temperature or pressure information is desired. This electric circuit includes the electrical conductor which is contained within the cable 18 and also includes the well casing 11 to which the conductor 119 is connected. The source of energy which may be considered as a part of the electrical circuit is shown at 123, and connected in this electrical circuit at the surface of the ground is an indicating means or a recording means. The indicating or recording means is shown in the form of the indicating means 118 which is operated in conjunction with the interrupter 111. It should be understood, however, that other types of indicating means which would automatically indicate the three separate indications without the necessity of the interrupter 111 may be employed, such indicating devices being well known in the electrical indicating industry at the time of filing this application.

Adapted to be connected to the electrical circuit at intervals is the temperature responsive means and the pressure responsive means. In conjunction with these general parts is the means whereby the temperature responsive means may be connected in the electrical circuit or the pressure responsive means may be connected in the electrical circuit, or whereby both of these apparatus may be disconnected from the electrical circuit and the electrical circuit closed at the point in the well where the temperature and pressure responsive means are located in order that the indicating means 118 will indicate only the resistance of the electrical circuit or the condition of the electrical circuit which, as pointed out heretofore, may vary in accordance with temperatures, contacts, and conditions of the well casing. It will be noted that the electrical circuit constitutes the means of my invention whereby the effect of temperature on the temperature responsive device or pressure on the pressure responsive device may be transmitted to the surface of the ground and be indicated on the indicating means 118.

In using the apparatus which I have shown it is first desirable to calibrate the indicating device 118, and this may be done as follows. The apparatus which is to be lowered into the well is first placed in a chamber wherein a known pressure may be built up. The parts of the apparatus at this time are adjusted so that the pressure responsive device is connected to the conductor in the cable 18 and the device grounded on the other side of the circuit to take the place of that portion of the circuit constituting the casing and conductor 119 when the device is in operation in the well. The associated rheostats comprising the parts 120 and 121 are then adjusted so that the pointer 125 properly indicates the pressure on the dial of the indicating device 118. The resistance of the circuit is then determined and of course the voltage of the current source is also known. An indicating device may record amperes or may be calibrated to indicate pounds pressure per square inch. However, with the three factors; namely, voltage, amperage, and resistance known, it is possible to form an equation whereby a change in the indication of the indicating device or in the resistance of the circuit may be used to determine correctly the pressure in the well.

The apparatus may then be subjected to a known temperature with the apparatus connected so that the temperature responsive means is connected to the electrical circuit, and the same type of calibration may be made. The apparatus is now ready to be lowered into the well and this is conveniently done since the cable including the conductor 109 is wound on the drum 124.

Before the device is lowered, clean oil of substantially the same characteristics as the oil in the well is poured through the openings 33 filling the passages 32 and 34, and the cylindrical passages 38a and 40. During the descent of the apparatus, the contactors 30 of the engagers 27 engage the inner wall of the tubing 19, but the resistance to downward travel of the apparatus resulting from this engagement is made insufficient by proper adjustment of the spring 27a to prevent the downward gravitational movement of the device. It should be particularly noted that the mechanism is such that the cylindrical body 20 can be of a sufficiently small diameter to pass through tubing 19 having any inner diameter commercially used. When the cylindrical body 20 passes below the lower end of the tubing 19 the engagers 27 expand in response to the compression of the spring 27a so that the contactors 30 engage the inner wall of the casing 11. Inasmuch as the contactors 30 are in the form of knife edges and are made of very hard material, an electrical contact is secured with the casing 11 even though the casing may be coated with rust or dirt. When the device has reached that level in the well at which it is desired to measure or determine the temperature and pressure of the liquid, which depth is ascertained by the length of the cable 18 which has been unreeled, the unreeling operation is terminated. The pressure on the liquid in the well at this level is communicated through the clean oil in the passages 32, 34, 38a and 40, and is exerted upon the plunger head 52. Thus the plunger 51 is urged upwardly with a force which is a function of the pressure of the liquid in the well. The upward movement of the plunger 51 and movable cylinder 53 attached thereto is resisted by the tension spring 55 so that the upward movement of the movable cylinder 53 is a function of the pressure on the liquid to be measured. As the movable cylinder 53 moves upwardly, the contactors 56 pass over the windings of the resistance wire 58 upon the resistance supporting cylinder 57, thus cutting out of the electrical circuit some resistance. The value of the resistance eliminated by the upward movement of the contactors 56 being a function of the pressure on the liquid to be measured, it is evident that the recording device 118, having an indicator 125 movable in response to current variations, will be moved over the scale 126 a distance which is a function of this pressure. The scale 126 is graduated in pounds per square inch, so that the indicator 125 indicates directly the pressure upon the liquid at the desired level in the well.

The electrical circuit enabling this indication to be secured is illustrated in Fig. 9 of the drawings, which shows one side of the source of potential as being connected through the indicating device 118 by a conductor 119 to a ground. The other side of the source of potential is connected through the indicating device 118 to the brush 117 of the circuit interrupter 111. The brush 117 is connected through the inner ring 116; the resistance 120 and contactor 121, the segment 113 and brush 110, to the solenoid 122 and to the cylindrical body 20. The passage of current through the winding of the solenoid 122 lifts the core upwardly, which moves the rod 90 and rack 89 to its uppermost position. The upward movement of the rack 89 moves the housing member 81 in a counter-clockwise direction, as viewed in Fig. 8, so that the balls 87 are in contact with the walls 86, and this rotation of the housing 81 results in no movement of the shaft 75.

The circuit from the brush 110 includes the conductor 109, brush 103, contact 106, contact 107, body of mercury 108, contact 92, outer ring 73, brush 63, conductor 60, resistance wire 58, cylindrical body 20, engagers 27, and contactors 30 which ground the circuit to the casing 11. It should be apparent that the upward movement of the movable cylinder 53 by diminishing the length of the resistance wire 58 in the circuit varies the current therein to give a sensible indication through the indicator 125 and the scale 126.

When the indication of the pressure on the liquid in the well has been noted, the circuit interrupter 111 is actuated by the rotation of the disc 112 in a clockwise direction, as indicated in Fig. 9, so that the brush 110 moves out of contact with the segment 113 and after an interval of time into contact with the segment 115. During the time that the brush 110 is in contact with no segment, the circuit through the solenoid 122 is interrupted, permitting the solenoid core and rod 90 and rack 89 to descend to its lowermost position by gravity. During the downward movement of the rack 89 the pinion 82 is rotated in a clockwise direction, as illustrated by the arrow 88a of Fig. 8. This rotation of the pinion 82 and housing 81 causes the balls 87 to be compressed by the curved walls 85 and the shaft 75, thus effecting the rotation of the shaft 75 in a direction indicated by the arrow 88a. The rack 89 is of such a length that its descent causes the rotation of the shaft 75 through one-third of a revolution. This rotation of the shaft 75 is accomplished by a corresponding rotation of the primary and secondary discs 74 and 78 and the closed receptacle 77. It should be particularly noted that during the period of time that this movement of the discs 74 and 78 and receptacle 77 is occurring, and the electrical connection between the contacts 92 and 107 is being disrupted, and the electrical connection between the contacts 96 and 105 is being established, the circuit through these contacts is open so that there is no liability of dangerous arcs being formed.

As the disc 112 of the circuit interrupter 111 continues to revolve, the brush 110 is brought into electrical contact with the segment 115, at which time the solenoid 122 is again energized, lifting the rod 90 and rack 89, which, as previously explained, is accomplished by no rotation of the shaft 75. The electrical connection of the brush 110 with the segment 115 establishes the circuit through the conductor 109, brush 103, inner ring 104, contact 106, body of mercury 108, contact 98 (the receptacle having been rotated so that that apex in which the contacts 106 and 98 are situated is now lowermost), the outer ring 97, brush 69, conductor 68, and resistance wire 67 which is connected through the cylindrical body 20 to the ground. The partition wall 62 being in fluid-tight engagement with the conductors 68 and 60, and partition wall 61 being in fluid-tight engagement with the conductor 60, the mercury in the container 64 is at approximately atmospheric pressure. By radiation, the temperature of the mercury, at short while after its submersion in the liquid in the well, becomes the same as the temperature of such liquid, and expands or contracts in response to such temperature. The reservoir 65, being of greater dimensions than the throat 66 of the container 64, the expansion or contraction of the body of mercury causes the mercury to ascend or descend in the throat 66 to a very appreciable extent. As the mercury ascends or descends in the throat 66, the effective resistance of the resistance wire 67 is decreased or increased so that a visible indication of this resistance, and hence the temperature of the liquid in the well, is indicated upon the indicating device 118. The contactors 121 having been adjusted relative to the resistances 120 of the segments 115 and 113, so that the indicator 125 of the indicating device 118 moves over the scale 127 upon the indicating device to indicate temperature, it should be apparent that if the scale 127 has been graduated empirically, the indicator 125 will indicate thereon correctly, in degrees, the temperature of the liquid in the well.

It will be understood, however, that the recordings, indications, or determinations of the indicating device 118 will be correct only if the voltage of the source of energy 123 and the resistance in the electrical circuit have not varied. Since the source of electrical energy is a constant potential source, this factor need not be taken into consideration. However, in view of the fact that any temperature change in the well affects the resistance of the electrical circuit, and in view of the fact that changes in contact with the casing or changes in the casing itself will affect the resistance of the electrical circuit, it is necessary to periodically check the resistance of the circuit and this is done after each temperature and pressure reading has been taken.

When the temperature of the liquid has been recorded, the disc 112 of the circuit interrupter 111 is rotated until the brush 110 moves out of contact with the segment 115. During the interval of time that the brush 110 is in contact with neither of the segments 113 to 115, the solenoid 122 is de-energized, permitting the arm 90 and rack 89 to descend, thus rotating the shaft 75, primary disc 74, secondary disc 78 and receptacle 77 through approximately 120°, as previously described; so that the body of mercury 108 in the receptacle 77 disconnects the contacts 106 and 98 and connects the contacts 105 and 96 while no current is flowing through the circuit. When the circuit interrupter has moved so that the brush 110 is in contact with the segment 114, the solenoid 122 is again energized, lifting the rack 89, which causes no movement of the shaft 75. The engagement of the brush 110 with the segment 114 completes the circuit through the conductor 109, brush 103, inner ring 104, contact 105, body of mercury 108, contact 96, inner ring 93, brush 94 and conductor 95 to the cylindrical body 20, and thus through the contactors 30 to ground.

It will be seen that when the parts are in the position just described the temperature responsive means and the pressure responsive means are wholly disconnected from the electrical circuit and that the electrical circuit is completed or shunted at its lowermost point in the well. The indicating device 118 at this time will indicate or measure only the electrical resistance in the electrical circuit itself. It will be seen, therefore, that the exact resistance in the electrical circuit may be determined and that any changes in resistance in the electrical circuit will be indicated. By proper adjustment of the rheostat associated with the segment 114 the current in the circuit just described is made of such a value that the indicator 125 of the indicating device indicates the value of the current in this circuit upon the scale 128 which is distinct from the scales 126 and 127 on the indicating device.

With the data obtained on the operation of the apparatus it is now possible to make any necessary corrections in the temperature or pressure indications in accordance with the conditions of the electrical circuit; that is, in accordance with the resistance or change in resistance which occurs during the operation of the apparatus or the performance of the process. For example, with the formula: volts divided by resistance equals amperage, and with the apparatus calibrated as explained heretofore the change in the resistance or any change in the amperage or the indication on the indicating means 118 may be employed to determine exactly what the pressure or the temperature within the well is. It will be seen that without the prior calibration to determine the relationship between the factors in the formula referred to and the temperature or pressure responsive means, or without the information as to the changes in resistance in the electrical circuit, accurate data or information cannot be obtained.

While the circuit interrupted 111 may be manually operated if desired, it may be mechanically actuated in any suitable manner, as by connecting the disc 112 to the shaft of the hour hand of a clock, so that one complete revolution of the disc 112 is accomplished each hour. Likewise, a recording device which includes means for continuously and permanently recording the values indicated by the indicator 125 may be substituted for the indicating device 118 illustrated in the drawings.

Inasmuch as the cylindrical body 20 of my invention may be made of very small external diameter, and inasmuch as the engagers 27 permit the passage of the apparatus out of and into the lower end of the tubing 19, it is apparent that I have by my invention provided an apparatus of the class described which can be employed for its intended purpose while the well is on production without removing the tubing, and with any size of tubing commercially employed, and that such apparatus may be employed for its intended purpose below the lower end of the tubing and within the casing.

While that embodiment of my invention hereinbefore illustrated and described is fully capable of performing the objects and providing the advantages primarly stated, there are various other embodiments of my invention likewise capable of performing these objects and providing these advantages, and I therefore wish my invention to be understood as not restricted to the specific embodiment hereinbefore set forth.

The indicating means 118 is typical of a measuring means which may be employed in the practice of my invention. In place of using a meter as illustrated one which makes a permanent record or graph may be employed. Likewise, either an ammeter, voltmeter, or other electrical responsive mechanism may be employed. The term "indicating means" or the "step of indicating" as employed in the claims is to be broadly construed to cover any indicating or measuring means whereby the electrical values in the circuit may be measured and the data thus obtained employed for determining the temperature and pressure or other phenomena in the well.

This application is a continuation of my application for Method and apparatus for measuring pressure and temperature at various depths in a bore hole, Serial No. 736,892, filed July 25, 1934.

I claim as my invention:

1. In an apparatus for determining, at the surface of the ground, phenomena which exist in a bore hole, the combination of: an electric circuit, a part of which extends into said bore hole; circuit breaking means operable to break said circuit; indicating means in said circuit; and apparatus adapted to be lowered into said bore hole to depths where said determination is to be made, said apparatus including pressure responsive means, temperature responsive means, solenoid means connected in said circuit and being deenergized when said circuit is opened, and switch means operated by said solenoid, and operable upon successive deenergization of said solenoid, for first connecting said pressure responsive means to said circuit, and then said temperature responsive means to said circuit.

2. In an apparatus for determining, at the surface of the ground, phenomena which exist in a bore hole, the combination of: an electric circuit, a part of which extends into said bore hole; circuit breaking means operable to break said circuit; indicating means in said circuit; and apparatus adapted to be lowered into said bore hole to depths where said determination is to be made, said apparatus including pressure responsive means, temperature responsive means, and switch means actuated by the successive opening and closing of said circuit, for first connecting said pressure responsive means to said circuit, and then said temperature responsive means to said circuit, and also for closing said circuit at its lower end with said pressure and temperature responsive means disconnected from said circuit.

3. In an apparatus for determining, at the surface of the ground, phenomena which exist in a bore hole, in which a casing has been installed, the combination of: an electrical conductor connected to said casing near its upper end and adapted to extend into said bore hole; indicating means connected in said conductor; and apparatus adapted to be lowered into said bore hole to depths where said determination is to be made, said apparatus including ground means for connecting said conductor to said casing at the location of said testing apparatus, so that said conductor and said casing constitute an electrical circuit, phenomena responsive means, and switch means operable to include said phenomena responsive means in said circuit, or to close said circuit with said phenomena responsive means excluded therefrom, so that said indicating means may indicate the effect of said phenomena responsive means, or the condition of said circuit.

GEORGE H. ENNIS.

CERTIFICATE OF CORRECTION.

Patent No. 2,190,260. February 13, 1940.

GEORGE H. ENNIS.

It is hereby certified that error appears in the printed specification of the above numbered patent requiring correction as follows: Page 4, first column, line 52, for the word "record" read indicate; and that the said Letters Patent should be read with this correction therein that the same may conform to the record of the case in the Patent Office.

Signed and sealed this 2nd day of April, A. D. 1940.

(Seal)
Henry Van Arsdale,
Acting Commissioner of Patents.